3,786,013
TRANSFER MEDIA AND TRANSFERABLE COATING COMPOSITIONS
Gary J. Peters, Dayton, Stanley R. Hermann, Xenia, Howard R. Jaynes, New Carlisle, and Larry F. Milbrandt, Cincinnati, Ohio, assignors to The National Cash Register Company, Dayton, Ohio
No Drawing. Filed Apr. 19, 1972, Ser. No. 245,617
Int. Cl. C08f 29/46, 45/24, 45/52
U.S. Cl. 260—28.5 R
6 Claims

ABSTRACT OF THE DISCLOSURE

Transferable coating compositions consisting essentially of two acrylate polymers, two waxes and at least one sensible material are disclosed. These coatings can be placed on a transfer base such as polyethylene terephthalate and transferred to paper tags and labels or plastic cards. These coatings have easily controlled transfer properties, excellent print quality and durability, and excellent shelf stability.

---

This invention relates to transfer media and to the transferable coating compositions thereon.

Transfer media having transferable coating compositions thereon are known in the art. U.S. Pat. 3,639,116 discloses coated transfer media for producing scratch and smudge resistant marks. The transfer media and coating compositions disclosed in this patent often are used in the printing of colored code bars on recording media such as paperboard marking tags and labels employed by merchandising institutions to identify inventory. Other transfer media and sensible coatings are disclosed in U.S. patent application Ser. No. 176,739, filed on Aug. 31, 1971. The coatings disclosed in this patent application generally are transferred to an enpaneled plastic card base such as a typical credit card or identification card. All of the above-mentioned coating compositions employ substantial amounts of a thermoplastic aminotriazine-sulfonamide-aldehyde resin.

Improved transfer media and transferable coating compositions now have been invented. The transferable coating compositions of this invention employ two acrylate polymers. By proper organic liquid carrier selection, one acrylate is dissolved and the other is dispersed. This unique combination of dissolved and dispersed acrylates provides coatings with excellent print quality and durability. Greater durability can also be achieved by heat fusing the print. The ribbon coating also has easily controlled transfer properties, as well as excellent shelf stability including resistance to high temperature and humidity. The transfer media and coating compositions of this invention can be employed with paper tags and labels as well as plastic cards.

Accordingly, an object of this invention is to provide transfer media.

Another object of this invention is to provide transferable coating compositions.

Other objects, aspects and advantages of this invention will be apparent to one skilled in the art from the following specification and appended claims.

The transferable coating compositions of this invention, on a dry basis, consist essentially of two acrylate polymers, two waxes and at least one sensible material. The compositions consist essentially of 80 to 95 weight percent of the acrylates, 2 to 10 weight percent of the waxes and 3 to 10 weight percent of the sensible material. Preferably, these percentages are 90 to 95, 2 to 5 and 3 to 5, respectively. The ratio, by weight, of the dissolved acrylate polymer to the dispersed acrylate polymer generally ranges from 1:2 to 1:12, preferably 1:4 to 1:9. The ratio, by weight of the waxes varies widely. Preferably this ratio is 1:1.

The acrylate polymers employed in this invention include the esters of both acrylic and methacrylic acids. This group includes acrylate and methacrylate polymers derived from cyanohydrins, acrylic and methacrylic acids, their anhydrides, amides, nitriles, halides, salts and the like.

The dispersed acrylate polymer has a glass transition temperature ranging from 30° C. to 90° C., preferably 40° C. to 90° C. Specific examples of the acrylate polymers are methyl methacrylate, isobutyl methacrylate and methyl/n-butyl methacrylate copolymer.

The soluble acrylate polymer has a glass transition temperature ranging from −50° C. to 30° C., preferably −20° C. to 30° C. Specific examples of acrylate polymers are methyl acrylate, isopropyl acrylate, sec-butylacrylate, n-dodecyl acrylate, n-tetradecyl acrylate, ethyl methacrylate, isopropyl methacrylate, n-butyl methacrylate and n-octyl methacrylate.

These acrylate polymers can be produced by the procedures described in the Kirk-Othmer Encyclopedia of Chemical Technology, vol. 1, pp. 180–184 (1947).

The wax used in the present invention is a wax having a melting point ranging between about 140 to 220, preferably about 165 to 200° F. as determined by ASTM D–127. Suitable waxes include natural waxes such as carnauba, montan and the like and mixtures thereof; synthetic waxes such as hydrogenated, amide, chlorinated, alkene or olefinic, miscellaneous and the like and mixtures thereof; and petroleum waxes such as microcrystalline, paraffin and the like and mixtures thereof.

The term wax, as used herein, defines a class of waxes which is characterized by a particular degree of hardness as determined by a needle penetration test ASTM D–1321. The needle penetration test measures the depth to which a weighted needle penetrates a sample of wax. In the needle penetration test, a wax sample is melted by heating it to about 30° F. above its melting point and is then solidified by cooling to 77° F. The hardness of the wax is measured with a penetrometer whereby a standard needle, under a load of 10 grams, is applied to the wax sample for 5 seconds. The depth to which the needle penetrates the wax during the 5 second time interval is measured in tenths of a millimeter. If the needle penetrates the wax to a depth of 0.2 millimeter, the hardness rating of the wax is 2. If the needle penetrates the wax to a depth of 0.8 millimeter, the rating of the wax is 8, and so forth. The waxes which can be used according to this invention are those which have a rating from about 0.5 to 10, preferably about 1 to 9. The wax can be an animal, mineral, petroleum, synthetic or vegetable wax or a mixture thereof so long as the wax is stable, can be meltable, emulsifiable or solvent dispersible, has the required degree of hardness and has the above indicated melting point range. The waxes employed in this invention generally act as pigment extenders. In the case of transfer to plastic cards, the waxes provide better flow properties during heat fusing.

The sensible material used in the present invention can be any material which is capable of being sensed visually, by optical means, by photoelectric means, by magnetic means, by electroconductive means or by any other means sensitive to the sensible material. The sensible material can be an inorganic or organic material such as any other material capable of being sensed and which is compatible with the coating composition.

Suitable sensible materials include phthalocyanine dyes such as Monastral Green B (color index No. 74260), Monastral Green G (color index No. 74250), Sherwood Green (color index No. 42000) and Tropical Brilliant Green (color index No. 42040); fluorescent rhodamine or xanthene dyes such as rhodamine B Extra (color index No. 45170), rhodamine GDN Extra (color index No.

45160), xylene red (color index No. 45100), rhodamine 5G (color index No. 45105), rhodamine G (color index No. 45150), and rhodamine 2B (color index No. 45151); fluorescent naphthalimide dyes such as brilliant yellow 6G (color index No. 29000) which has the formula 4 amino, 1,8 naphthal 2',4' dimethyl phenylimide, other fluorescent naphthalimide dyes such as (4n-butyl-amino) 1,8 naphthal n-butyl amide and 4 amino 1,8-naphthal p-xenyl imide; other dyes or pigments such as malachite green (color index No. 42000); cadmium primrose (color index No. 77199), chrome yellow (color index No. 77600), Ultramarine Blue (color index No. 77007), Phthalocyanine Blue (color index No. 74160), Lake Red C (color index No. 15585), Sodium Lithol Red (color index No. 15630), titanium dioxide and zinc oxide; magnetic metal oxides such as iron oxide, cobalt and nickel oxide; finely divided metals and alloys such as bronze, stainless steel, iron, cobalt, nickel and chrome; and miscellaneous coloring materials such as carbon black, conductive carbon and charcoal.

As an example of sensible material which is not normally visible, but can be detected, a small amount of a material such as 4-methyl-7-diethylamino coumarin will not color a coating composition when it is exposed to ordinary light but will produce a bright blue color when the coating composition is exposed to ultraviolet light.

The sensible material can include any luminescent, fluorescent or phosphorescent material, either organic or inorganic, or any materials which are activated by energy of short wave length and emit energy of longer wave length, and phosphorescent materials which continue to emit light or energy after excitation is discontinued.

The above-named sensible materials constitute only a fraction of the many different sensible materials that can be used in the present invention and are not to be construed as limiting the scope of the suitable sensible materials that can be used in the present invention. Any of the above-named sensible materials can be used alone or in combination with each other or in combination with other suitable sensible materials not specifically named above. The sensible material need only be suitable for the sensing required, have a high resistance to scratching and smudging when the coating composition is transferred onto the recording medium and be compatible with the coating composition.

The sensible material can be chosen so that the transferred coating composition will reflect a cerain amount of light within a particular wave length. For example, a black sensible material can be chosen so that the transferred coating composition has a diffused reflectance of less than 15 percent of light between a wave length of 600 and 1200 nanometers and a green sensible material can be chosen so that the transferred coating composition has a diffused reflectance of less than 15 percent of light between a wave length of 600 to 750 nanometers, 50 percent of light at some point between a wave length of 820 and 870 nanometers, and greater than 80 percent of light between a wave length of 900 and 1200 nanometers. The wave length of light between 600 and 1200 nanometers is within the visible and the near infra-red spectrum. The choosing of a sensible material for such optical properties is useful in an optical sensing device.

The base to which the transferable coating composition is applied can be a thin material such as a film, web, sheet, ribbon, fabric or the like. The preferred base is a film of polyethylene terephthalate, however, other bases can be used. For example, cellulosic materials, paper, cellophane, nylon, rubber hydrochloride, polyethylene, polypropylene and the like are acceptable bases when used in the form of a film, web, sheet, ribbon, fabric or the like. The base should have a thickness of about 0.2 to 2, preferably about 0.3 to 0.8 mil. The base should be such that the transferable coating composition adheres to the base in a proper manner prior to transfer of the coating composition to the recording medium and the transferable coating composition is released from the base in a proper manner upon transfer. The base should be limited in thickness to permit a full realization of the capability of the transferable coating composition to deposit marks having sharp, clear edge definition on a recording medium. The base should also possess uniform tensile and other physical properties to insure uniform transfer of the coating composition onto a recording medium.

The transferable coating composition is applied to the base by means of a volatile or organic liquid carrier. The wet coating composition is spread uniformly over the base and the volatile organic liquid carrier is then allowed to evaporate thereby leaving a tarnsferable coating composition deposited on the base. The transferable coating composition can be applied to the base by roll coating, knife coating or by a similar means. The volatile organic liquid carrier can be evaporated by ambient temperature or can be evaporated by the application of gentle heat thereby leaving a transferable coating composition having a thickness of about 0.1 to 0.4, preferably about 0.15 to 0.3, mil deposited on the base.

The volatile organic liquid carriers for the coating composition being a solvent (solubility greater than 10 g./100 cc., preferably greater than 20 g./100 cc.) for one polymer and non-solvent (solubility less than 2 g./100 cc., preferably less than 1 g./100 cc.) for the other polymer include aliphatic and aromatic hydrocarbon solvent such as mineral spirits, naphtha, xylene, cyclohexane and mixtures thereof. Other organic carriers include n-propyl alcohol, isopropyl alcohol, isoamyl alcohol, cyclohexyl alcohol, dimethyl formamide, carbon tetrachloride, perchloroethylene, n-butyl acetate, diethyl ether trichlorofluoromethane, trichlorotrifluoroethane, n-hexane, turpentine, methyl isobutyl ketone, diisobutyl ketone, cyclohexanone and mixtures thereof. The wet composition generally contains 40 to 70 weight percent organic liquid, preferably 60 to 70.

The paper tags and labels, plastic cards and methods of transfer which are employed to transfer the transferable coating compositions of this invention are fully described in previously mentioned U.S. Pat. 3,639,166 and patent application Ser. No. 176,739, and will not be repeated herein.

The advantages of this invention are further illustrated by the following examples. The reactants and the proportions and other specific conditions are presented as being typical and should not be constructed to limit the invention unduly.

EXAMPLE I

Green and black transfer media were prepared in the following manner using the coating compositions described below.

COATING COMPOSITIONS

|  | Weight percent dry | Weight percent wet |
|---|---|---|
| Components of formulations A and B: | | |
| n-Butylmethacrylate [1] | 11.95 | 4.78 |
| Methyl/n-butyl methacrylate [2] | 80.23 | 32.09 |
| Bisamide wax [3] | 1.55 | 0.62 |
| Modified microcrystalline wax [4] | 1.55 | 0.62 |
| Monastral Green "B" pigment [5] or carbon black [6] | 4.72 | 1.89 |
| Naphtha [7] | 0 | 60.00 |
| Components of formulations C and D: | | |
| n-Butyl methacrylate [1] | 15.97 | 6.39 |
| Methyl/n-butyl methacrylate [2] | 76.58 | 30.63 |
| Bisamide wax [3] | 1.48 | 0.59 |
| Modified microcrystalline wax [4] | 1.48 | 0.59 |
| Monastral Green "B" pigment [5] or carbon black [6] | 4.49 | 1.80 |
| Naphtha | 0 | 60.00 |

[1] Elvacite 2044 from E. I. du Pont de Nemours & Co., Inc.
[2] Elvacite 2013 from E. I. du Pont de Nemours & Co., Inc.
[3] 240 Wax from Carlisle Chemical Works, Inc. represented by the structure R—CO—NH—R'—NH—CO—R with the amide group derived from Oleamide and having a M.P. of about 115° C.
[4] WB-2 Wax from Bareco Division of Petrolite Corporation, see footnote 12, Example 2 of U.S. Patent 3,639,166.
[5] Marketed by E. I. du Pont de Nemours & Co., Inc.
[6] Raven 150 from Columbain.
[7] V.M. & P. naphtha, also known as painters' naphtha or varnish makers' naphtha.

Each of the solvented formulations was prepared with conventional dispersion equipment (Attritor) and then ball-milled until the particle size was less than 5 microns. Each wet formulation was coated onto a polyester film by conventional means, i.e., the formulations were applied to a low weight film of polyethylene terephthalate having a thickness of 0.0005" on a pilot coater at a web speed of 200 ft./min. A pressure application/wire-wound rod metering system was used to spread the formulation over the film and followed by drying with 120° F. hot air.

EXAMPLE II

The transferable coating compositions of Example I were transferred to credit card panels and sealed according to the procedure described in Example I of previously mentioned U.S. patent application Ser. No. 176,739. Subsequent evaluations of the heat fused code formats revealed excellent print quality and durability. Durability tests included probing, simulated finger smudging, "Scotch" brand-tape adhesion, and sand abrasion resistance.

The green and black printing ribbons were then placed in an NCR Class Color Bar Code System Tag and Label Printer manufactured by The National Cash Register Company, Dayton, Ohio, U.S.A. The Tag and Label Printer printed a sequence of green and black bars on white paper labels. These green and black printed bars contain binary bits of encoded information that are read by an optical detection system wherein the spectral properties of the green and black printed bars and the white spaces of the paper label between the colored bars activate a sensing device. The sensing device is activated by passing an optical probe tip over the printed bars; therefore, the printed bars must possess a clear edge definition and have a high resistance to scratching and smudging in order for the encoded information contained in the bars to be properly read. Such a printing and optical scanning system is disclosed in U.S. patent applications Ser. No. 837,514, filed June 30, 1969, and Ser. No. 837,850, filed June 30, 1969.

The green and black bars printed on the labels were tested for resistance to scratching and smudging using a Gardner Laboratory Scratch Tester. A standard color bar code system probe tip used in the optical system under 500 grams of weight and perpendicular to the plane of the printed bars was contacted with and passed over the printed bars ten times. The standard probe tip was a color bar code system optical probe tip. The printed bars possessed excellent resistance to scratching and smudging upon visual examination'

Environmental tests indicate the transfer media prepared in Example I can be stored at 99% relative humidity and 120° F. for at least 3 weeks without degradation of either print quality or durability.

Although this invention has been described in considerable detail, it must be understood that such detail is for the purposes of illustration only and that many variations and modifications can be made by one skilled in the art without departing from the scope and spirit thereof.

What is claimed is:
1. A transferable coating composition consisting essentially of
    (1) 40 to 70 weight percent volatile organic liquid carrier and
    (2) the remainder nonvolatile coating composition material consisting essentially, on a dry weight basis, of:
        (a) 80 to 95 weight percent of two acrylate polymers;
            (i) one acrylate polymer dissolved in the liquid carrier, soluble in the liquid carrier to an extent of at least 10 grams per 100 cubic centimeters of carrier, exhibiting a glass transition temperature of −50 to 30° C. and selected from the group consisting of methyl methacrylate polymer, isobutyl methacrylate polymer and, methyl/n-butyl methacrylate copolymer and
            (ii) the other acrylate polymer dispersed in the liquid carrier, soluble in the liquid carrier to an extent of less than 2 grams per 100 cubic centimeters of carrier, exhibiting a glass transition temperature of 30 to 90° C., and selected from the group consisting of methyl acrylate polymer, isopropyl acrylate polymer, sec-butyl acrylate polymer, n-dodecyl acrylate polymer, n-tetradecyl acrylate polymer, ethyl methacrylate polymer, isopropyl methacrylate polymer, n-butyl methacrylate polymer and n-octyl methacrylate polymer, dispersed in the liquid carrier and present in weight ratio to the dissolved acrylate ranging from 2:1 to 12:1;
        (b) 2 to 10 weight percent of wax having a melting point ranging from 140 to 220° F. and a needle penetration ranging from 0.5 to 10; and
        (c) 3 to 10 weight percent of sensible material.
2. A transferable coating composition according to claim 1 wherein the glass transition temperature of the dispersed acrylate polymer ranges from 30 to 90° C., the glass transition temperature of the dissolved acrylate polymer ranges from −20 to 30° C., and the ratio by weight of the dissolved acrylate polymer to the dispersed acrylate polymer ranges from 1:4 to 1:9.
3. A transferable coating composition according to claim 1 wherein the volatile organic liquid is an aliphatic or an aromatic hydrocarbon solvent, the dissolved acrylate polymer has a solubility in the volatile organic liquid carrier greater than 10 g./100 cc. and the dispersed acrylate polymer has a solubility in the volatile organic liquid carrier less than 2 g./100 cc.
4. A transferable coating composition according to claim 1 wherein the solubility of the dissolved acrylate polymer is greater than 20 g./100 cc. and the solubility of the dispersed acrylate polymer is less than 1 g./100 cc.
5. A transferable coating composition according to claim 1 wherein the sensible material is a green pigment or a black pigment.
6. A transferable coating composition according to claim 1 wherein said volatile organic liquid carrier is naphtha.

References Cited
UNITED STATES PATENTS

| | | | |
|---|---|---|---|
| 3,297,477 | 1/1967 | Barkis et al. | 260—28.5 R |
| 2,558,791 | 7/1951 | Smith et al. | 117—3.4 |
| 2,476,570 | 7/1949 | Van Horn et al. | 117—3.4 |
| 3,148,617 | 9/1964 | Roshkind | 117—3.4 |
| 3,301,801 | 1/1967 | Gaske | 260—28.5 R |

MORRIS LIEBMAN, Primary Examiner

S. L. FOX, Assistant Examiner

U.S. Cl. X.R.

117—3.4; 260—33.6 UA, 901